(12) United States Patent
Yang et al.

(10) Patent No.: US 10,897,332 B2
(45) Date of Patent: Jan. 19, 2021

(54) METHOD AND DEVICE FOR TRANSMITTING SYNCHRONIZATION SIGNAL BLOCKS

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/364,755

(22) Filed: Mar. 26, 2019

(65) Prior Publication Data

US 2019/0222368 A1 Jul. 18, 2019

Related U.S. Application Data

(63) Continuation of application No. PCT/CN2017/109605, filed on Nov. 6, 2017.

(30) Foreign Application Priority Data

Nov. 6, 2017 (WO) ................ PCT/CN2017/109605

(51) Int. Cl.
 *H04L 5/00* (2006.01)
 *H04W 72/04* (2009.01)
 (Continued)

(52) U.S. Cl.
 CPC ............ *H04L 5/001* (2013.01); *H04L 5/0048* (2013.01); *H04L 5/0053* (2013.01);
 (Continued)

(58) Field of Classification Search
 None
 See application file for complete search history.

(56) References Cited

U.S. PATENT DOCUMENTS

2017/0094624 A1 3/2017 Balachandran et al.
2018/0270772 A1* 9/2018 Ly ...................... H04W 72/005
(Continued)

FOREIGN PATENT DOCUMENTS

CN 104205738 A 12/2014
CN 104396296 A 3/2015
(Continued)

OTHER PUBLICATIONS

The International Search Report dated Feb. 26, 2018; PCT/CN2017/109605.
(Continued)

*Primary Examiner* — Rebecca E Song

(57) ABSTRACT

The present application provides a method and apparatus for transmitting synchronization signal blocks, the method comprising: determining M target frequency domain locations for carrying M synchronization signal blocks within a broadband component carrier, where each of the target frequency domain locations is used for carrying one synchronization signal block, and M is a positive integer greater than or equal to 1; transmitting the M synchronization signal blocks to a terminal device on the M target frequency domain locations. The method for transmitting the synchronization signal blocks provided by the present application can implement transmission of multiple synchronization signal blocks within a broadband component carrier, thus meeting the requirements of new radio communication system.

17 Claims, 7 Drawing Sheets

200

When target synchronization signal blocks in S synchronization signal blocks are received within a broadband component carrier, determining, according to target frequency domain locations carrying the target synchronization signal blocks, other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block ⟶ S210

(51) Int. Cl.
  *H04W 56/00*   (2009.01)
  *H04L 7/00*   (2006.01)
(52) U.S. Cl.
  CPC .............. *H04L 5/0094* (2013.01); *H04L 7/00* (2013.01); *H04W 56/00* (2013.01); *H04W 56/001* (2013.01); *H04W 72/04* (2013.01); *H04W 72/042* (2013.01)

(56) References Cited

U.S. PATENT DOCUMENTS

| | | | | |
|---|---|---|---|---|
| 2019/0297560 | A1* | 9/2019 | Gao | H04W 48/08 |
| 2019/0364523 | A1* | 11/2019 | Wei | H04W 72/0446 |
| 2020/0059875 | A1* | 2/2020 | Takeda | H04W 74/0833 |
| 2020/0259696 | A1* | 8/2020 | Sun | H04L 5/0048 |

FOREIGN PATENT DOCUMENTS

| | | |
|---|---|---|
| CN | 105208582 A | 12/2015 |
| CN | 105357751 A | 2/2016 |
| CN | 106301735 A | 1/2017 |
| CN | 106332112 A | 1/2017 |
| CN | 106688261 A | 5/2017 |
| CN | 106793058 A | 5/2017 |
| CN | 106793059 A | 5/2017 |
| CN | 106793100 A | 5/2017 |
| CN | 106797611 A | 5/2017 |
| CN | 108282317 A | 7/2018 |
| CN | 108631982 A | 10/2018 |
| CN | 108632982 A | 10/2018 |

OTHER PUBLICATIONS

The first OA of the parallel CN application dated Dec. 2, 2019.
"On synchronization signal raster and subcarrier spacing", R4-1705292, 3rd Generation Partnership Project (3GPP); Mobile Competence Centre; vol. RAN WG4; no. Hangzhou, China; May 14, 2017-May 20, 2017; May 14, 2017 (May 14, 2017).
"Way forward on initial access and mobility for wider BW operation", R1-1709505; 3rd Generation Partnership Project (3GPP); Mobile Competence Centre; vol. RAN WG1, no. Hangzhou; May 15, 2017-May 19, 2017, May 18, 2017 (May 18, 2017).
"Further views on wider bandwidth operations for NR"; R1-1708494 Wider BW for NR, 3rd Generation Partnership Project (3GPP); Mobile Competen; vol. RAN WG1, no. Hangzhou; May 15, 2017-May 19, 2017; May 14, 2017 (May 14, 2017).
"Details on NR PBCH design", R1-1707339 Intel PBCH, Generation Partnership Project (3GPP); Mobile Competence Centre; vol. RAN WG1; no. Hangzhou; May 15, 2017-May 19, 2017; May 14, 2017 (May 14, 2017).
Extended European Search Report dated Aug. 22, 2019; Appln. No. 17913199.0.
The Notice of Allowance of corresponding Taiwan application dated Oct. 17, 2019.
ZTE, "The composition of SS blocks and SS burst sets", R1-1707043, 3GPP TSG RAN WG1 Meeting 89, Hangzhou, China May 15-19, 2017.
Intel Corporation, "SS block composition", R1-1707337, 3GPP TSG RAN WG1 MeetingRAN1 89, Hangzhou, P.R. China May 15-19, 2017.

* cited by examiner

100

```
┌─────────────────────────────────────────────────────────────┐
│  Determining M target frequency domain locations for        │
│ carrying M synchronization signal blocks within a broadband │
│ component carrier, where each of the target frequency domain│ ~S110
│   locations is used for carrying one synchronization signal │
│    block, and M is a positive integer greater than or equal to 1 │
└─────────────────────────────────────────────────────────────┘
                              │
┌─────────────────────────────────────────────────────────────┐
│   Transmitting the M synchronization signal blocks to a     │ ~S120
│   terminal device on the M target frequency domain locations│
└─────────────────────────────────────────────────────────────┘
```

> When target synchronization signal blocks in S synchronization signal blocks are received within a broadband component carrier, determining, according to target frequency domain locations carrying the target synchronization signal blocks, other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block ∼S210

When target synchronization signal blocks in the S synchronization signal blocks are received within a broadband component carrier, determining other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except the target frequency domain locations carrying the target synchronization signal blocks in the S target frequency domain locations, and each of the target frequency domain locations is used for carrying one synchronization signal block ~S310

FIG. 5

METHOD AND DEVICE FOR TRANSMITTING SYNCHRONIZATION SIGNAL BLOCKS

CROSS-REFERENCE TO RELATED APPLICATIONS

This application is a continuation of International Application No. PCT/CN2017/109605, filed on Nov. 6, 2017, which claims the priority of the PCT Application with the number of PCT/CN2017/088521, filed on Jun. 15, 2017, to the Chinese Patent Office, entitled "Method and Device for Transmitting Synchronization Signal Blocks", the entire contents of which are hereby incorporated by reference.

TECHNICAL FIELD

Embodiments of the present application relate to the field of communications, and more particularly, to a method and device for transmitting synchronization signal blocks.

BACKGROUND

The long term revolution (LTE) system supports single carrier operations and carrier aggregation (CA) operations. For the single carrier operations, within the system bandwidth, there is only one primary synchronization signal (PSS) and one secondary synchronization signal (SSS) in the frequency domain. For the carrier aggregation operations, the maximum bandwidth for a component carrier in the LTE system is 20 MHz, and there is also only one PSS/SSS channel on the frequency domain in each component carrier. In particular, the six physical resource blocks (PRB) occupied by the PSS/SSS of the LTE system are located at the central location of the system bandwidth.

At present, the 3GPP has reached a consensus that a network device transmits an SS burst set including a plurality of SS blocks to a terminal, and each SS block includes a PSS, an SSS, and a physical broadcast channel (PBCH). And the frequency location of the SS block within the system bandwidth is not limited to the central frequency point location of the system bandwidth. The terminal searches for the SS block within the system bandwidth to obtain time-frequency synchronization and obtain PBCH information, and perform radio resource management (RRM) measurement.

For new radio (NR) communication system, broadband component carriers that the bandwidth is very large may be supported, such as a broadband component carrier that the bandwidth is 400 MHz or even 1 GHz. Within a same broadband component carrier, terminal devices with multiple operation bandwidths are distributed, for example, in a case that the system bandwidth is 400 MHz, terminal devices that the bandwidth is 400 MHz, as well as terminal devices that the bandwidth is 100 MHz, 40 MHz or 10 MHz, may be distributed. If there is only one location for the SS block within the broadband component carrier, the terminal device with a smaller operation bandwidth may not have an SS block within its operation bandwidth. And for a broadband component carrier with a very large bandwidth, the propagation characteristics of its different frequency locations may be greatly different.

Therefore, it is desirable to provide a method for transmitting synchronization signal blocks to enable transmission of multiple SS blocks within a broadband component carrier.

SUMMARY

The present application provides a method and device for transmitting synchronization signal blocks and capable of implementing transmission of multiple SS Blocks within a broadband component carrier.

In a first aspect, a method for transmitting synchronization signal blocks is provided, including: determining M target frequency domain locations for carrying M synchronization signal blocks within a broadband component carrier, where each of the target frequency domain locations is used for carrying one synchronization signal block, and M is a positive integer greater than or equal to 1; transmitting the M synchronization signal blocks to a terminal device on the M target frequency domain locations.

In the method for transmitting synchronization signal blocks of an embodiment of the present application, the network device determines multiple frequency domain locations for carrying multiple synchronization signal blocks within the broadband component carrier, and transmits the multiple synchronization signal blocks to the terminal device on the multiple frequency domain locations, which can implement the transmission of multiple synchronization signal blocks within one broadband component carrier and meet requirements of the new radio communication system.

With reference to the first aspect, in an implementation of the first aspect, the method further includes determining a value of M according to a bandwidth of the broadband component carrier.

In an embodiment, determining the value of M according to the bandwidth of the broadband component carrier and a target mapping relationship, where the target mapping relationship is a mapping relationship between a bandwidth and the number of synchronization signal blocks that can be transmitted within the bandwidth.

With reference to the first aspect and the foregoing implementations, in another implementation of the first aspect, the determining a value of M according to a bandwidth of the broadband component carrier includes: determining the value of M according to the bandwidth of the broadband component carrier and an operation bandwidth supported by a terminal device accessing in the broadband component carrier, where the terminal device accessing in the broadband component carrier includes the terminal device.

According to the bandwidth of the broadband component carrier and the operation bandwidth supported by the terminal device accessing in the broadband component carrier, it is enabled that the synchronization signal blocks can exist within an operation bandwidth of a terminal device with relatively small operation bandwidth, thereby the terminal device can be prevented from receiving the synchronization signal blocks by means of frequency modulation, so as to reduce the implementation complexity of the terminal device.

With reference to the first aspect and the foregoing implementations, in another implementation of the first aspect, the determining M target frequency domain locations for carrying M synchronization signal blocks within a broadband component carrier includes: determining M first frequency domain locations within the broadband component carrier as the M target frequency domain locations, where a frequency interval between two adjacent first frequency domain locations within the M first frequency domain locations is a first target frequency interval.

It can be understood that the frequency interval between two adjacent first frequency domain locations within the M first frequency domain locations is the first target frequency interval, indicating that the M first frequency domain locations are evenly distributed.

With reference to the first aspect and the foregoing implementations, in another implementation of the first aspect, the M first frequency domain locations are determined based on N second frequency domain locations, and a frequency interval between two adjacent second frequency domain locations in the N second frequency domain locations is a second target frequency interval, where N is a positive integer greater than or equal to M.

With reference to the first aspect and the foregoing implementations, in another implementation of the first aspect, the target frequency interval is an integer multiple of a synchronization signal frequency grid.

With reference to the first aspect and the foregoing implementations, in another implementation of the first aspect, the determining M target frequency domain locations for carrying M synchronization signal blocks within a broadband component carrier includes: determining, according to a distribution pattern of target synchronization signal blocks, the M target frequency domain locations, where the distribution pattern of the target synchronization signal blocks is used to indicate a frequency interval between two adjacent target frequency domain locations.

With reference to the first aspect and the foregoing implementations, in another implementation of the first aspect, the frequency interval between the two adjacent target frequency domain locations is an integer multiple of a synchronization signal frequency grid.

Since the M target frequency domain locations that carry the M synchronization signal blocks have a determined frequency relative relationship, the terminal device can determine the target frequency domain locations that carry the other synchronization signal blocks as long as only one synchronization signal block is searched. The network device can effectively reduce the signaling overhead without separately indicating the target frequency domain locations carrying each of synchronization signal blocks.

With reference to the first aspect and the foregoing implementations, in another implementation of the first aspect, the method further includes: transmitting first configuration information to the terminal device, where the first configuration information is used to indicate a number of each of synchronization signal blocks in the M synchronization signal blocks on a frequency domain.

With reference to the first aspect and the foregoing implementations, in another implementation of the first aspect, the method further includes: transmitting second configuration information to the terminal device; where the second configuration information includes at least one of the following information: a bandwidth of the broadband component carrier, a center frequency point of the broadband component carrier, a value of M, a frequency interval of two adjacent first target frequency domain locations in the M first target frequency domain locations, and a distribution pattern of synchronization signal blocks.

With respect to the first aspect and the foregoing implementations, in another implementation of the first aspect, the distribution pattern of the synchronization signal blocks is used to indicate a frequency domain offset between synchronization signal blocks except reference synchronization signal blocks in S synchronization signal blocks in the M synchronization signal blocks and the reference synchronization signal blocks.

With reference to the first aspect and the foregoing implementations, in another implementation of the first aspect, the distribution pattern of the synchronization signal blocks includes a frequency value of the frequency domain offset or a number value corresponding to the frequency domain offset.

With respect to the first aspect and the foregoing implementations, in another implementation of the first aspect, the distribution pattern of the synchronization signal blocks is used to indicate a transmission period of each of synchronization signal blocks in S synchronization signal blocks in the M synchronization signal blocks, and/or a time domain offset between synchronization signal blocks except reference synchronization signal blocks and the reference synchronization signal blocks.

With reference to the first aspect and the foregoing implementations, in another implementation of the first aspect, the transmitting second configuration information to the terminal device includes:

transmitting the corresponding second configuration information respectively for at least part of synchronization signal blocks in the M synchronization signal blocks, where reference synchronization signal blocks in the distribution pattern of the synchronization signal blocks in the second configuration information are synchronization signal blocks corresponding to the second configuration information.

With reference to the first aspect and the foregoing implementations, in another implementation of the first aspect, the method further includes: transmitting third configuration information to the terminal device, where the third configuration information includes at least one of the following: a bandwidth of the broadband component carrier, a center frequency point of the broadband component carrier, a value L, a frequency interval of two adjacent target frequency domain locations in the M target frequency domain locations, and a distribution pattern of synchronization signal blocks, where L is a positive integer less than M.

With the first aspect and the foregoing implementations, in another implementation of the first aspect, in the case that the third configuration information includes the value L and transmitting the first configuration information to the terminal device, the third configuration information further includes numbers of L synchronization signal blocks corresponding to the value L.

With reference to the first aspect and the foregoing implementations, in another implementation of the first aspect, the numbers of the L synchronization signal blocks corresponding to the value L are determined by the network device based on numbers of synchronization signal blocks reported by the terminal device.

With reference to the first aspect and the foregoing implementations, in another implementation of the first aspect, frequencies at the M target frequency domain locations are integer multiples of a synchronization signal frequency grid.

With reference to the first aspect and the foregoing implementations, in another implementation of the first aspect, the method further includes:

transmitting corresponding fourth configuration information respectively for at least part of synchronization signal blocks in the M synchronization signal blocks, where the fourth configuration information is used to indicate a frequency domain offset between other synchronization signal blocks in S synchronization signal blocks in the M synchronization signal blocks and synchronization signal blocks corresponding to the fourth configuration information.

With reference to the first aspect and the foregoing implementations, in another implementation of the first aspect, the fourth configuration information includes a number value corresponding to the frequency domain offset, or a frequency value of the frequency domain offset.

With reference to the first aspect and the foregoing implementations, in another implementation of the first aspect, the method further includes:

transmitting corresponding fifth configuration information respectively for at least part of synchronization signal blocks in the M synchronization signal blocks, where the fifth configuration information is used to indicate a time domain offset between other synchronization signal blocks in S synchronization signal blocks in the M synchronization signal blocks and synchronization signal blocks corresponding to the fifth configuration information.

With reference to the first aspect and the foregoing implementations, in another implementation of the first aspect, the method further includes:

transmitting sixth configuration information to the terminal device, where the sixth configuration information is used to indicate a transmission period of each of synchronization signal blocks in S synchronization signal blocks in the M synchronization signal blocks and/or a time domain offset between the S synchronization signal blocks.

With reference to the first aspect and the foregoing implementations, in another implementation of the first aspect, the method further includes:

transmitting corresponding seventh configuration information respectively for at least part of synchronization signal blocks in the M synchronization signal blocks, where the seventh configuration information is used to indicate frequency values of frequency points of other synchronization signal blocks except synchronization signal blocks corresponding to the seventh configuration information in S synchronization signal blocks in the M synchronization signal blocks.

With reference to the first aspect and the foregoing implementations, in another implementation of the first aspect, the method further includes:

transmitting eighth configuration information to the terminal device, where the eighth configuration information is used to indicate a frequency value of a frequency point of each of synchronization signal blocks in S synchronization signal blocks in the M synchronization signal blocks.

In a second aspect, a method for transmitting synchronization signal blocks is provided, including: when target synchronization signal blocks in S synchronization signal blocks are received within a broadband component carrier, determining, according to target frequency domain locations carrying the target synchronization signal blocks, other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block.

According to the method for transmitting synchronization signal blocks of the present application, the terminal device, according to the target frequency domain locations of the detected target synchronization signal blocks, can determine frequency domain locations of other synchronization signal blocks in the same broadband component carrier as the detected synchronization signal blocks.

In an embodiment, the network device may not specifically indicate the specific frequency domain location of each of synchronization signal blocks to the terminal device, which can reduce the signaling overhead.

With reference to the second aspect, in an implementation of the second aspect, a frequency interval between two adjacent target frequency domain locations in the S target frequency domain locations is a first target frequency interval;

where the determining, according to target frequency domain locations carrying the target synchronization signal blocks, other target frequency domain locations for carrying other synchronization signal blocks, in S target frequency domain locations includes: determining, according to the target frequency domain locations carrying the target synchronization signal blocks and the first target frequency interval, the other target frequency domain locations.

With reference to the second aspect and the foregoing implementations, in another implementation of the second aspect, the first target frequency interval is an integer multiple of a synchronization signal frequency grid.

With reference to the second aspect and the foregoing implementations, in another implementation of the second aspect, the S target frequency domain locations are determined based on N second frequency domain locations, and a frequency interval between two adjacent second frequency domain locations in the N second frequency domain locations is a second target frequency interval, where N is a positive integer greater than or equal to S.

With reference to the second aspect and the foregoing implementations, in another implementation of the second aspect, the determining, according to target frequency domain locations carrying the target synchronization signal blocks, other target frequency domain locations for carrying other synchronization signal blocks in S target frequency domain locations includes: determining the other target frequency domain locations according to the target frequency domain locations carrying the target synchronization signal blocks and a distribution pattern of target synchronization signal blocks, where the distribution pattern of the target synchronization signal blocks is used to indicate a frequency interval between two adjacent target frequency domain locations.

In an embodiment, the distribution pattern of the target synchronization signal blocks may be agreed by the network device and the terminal device in advance; or the distribution pattern of the target synchronization signal blocks may be what the network device notifies the terminal device of by signaling.

With reference to the second aspect and the foregoing implementations, in another implementation of the second aspect, the frequency interval between the two adjacent target frequency domain locations is an integer multiple of a synchronization signal frequency grid.

With reference to the second aspect and the foregoing implementations, in another implementation of the second aspect, the method further includes: receiving first configuration information, where the first configuration information is used to indicate a number of each of synchronization signal blocks in the S synchronization signal blocks on a frequency domain;

where the determining, according to target frequency domain locations carrying the target synchronization signal blocks, other target frequency domain locations for carrying other synchronization signal blocks includes: determining, according to the target frequency domain locations carrying the target synchronization signal blocks and the first configuration information, the other target frequency domain locations.

With reference to the second aspect and the foregoing implementations, in another implementation of the second aspect, the method further includes: receiving second configuration information, where the second configuration information includes at least one of the following: a bandwidth of the broadband component carrier, a center frequency point of the broadband component carrier, a value of S, a frequency interval of two adjacent target frequency domain locations in the S target frequency domain locations, and a distribution pattern of synchronization signal blocks; where the determining, according to the target frequency domain locations carrying the target synchronization signal blocks and the first configuration information, the other target frequency domain locations includes: determining, according to the target frequency domain locations carrying the target synchronization signal blocks, the first configuration information, and the second configuration information, all of target frequency domain locations except the target frequency domain locations carrying the target synchronization signal blocks in the S target frequency domain locations.

With reference to the second aspect and the foregoing implementations, in another implementation of the second aspect, the method further includes: receiving third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S; where the determining, according to the target frequency domain locations carrying the target synchronization signal blocks and the first configuration information, other target frequency domain locations for carrying other synchronization signal blocks includes: determining, according to the target frequency domain locations carrying the target synchronization signal blocks, the first configuration information, and the third configuration information, L or L−1 target frequency domain locations except the target frequency domain locations carrying the target synchronization signal blocks in the S target frequency domain locations.

In an embodiment, the network device and the terminal device may agree in advance, or the network device may notify the terminal device in advance that the total number of the target frequency domain locations that the terminal device needs to determine if the value L is included in the third configuration information. If the total number of the target frequency domain locations that the terminal device needs to determine is L, then the terminal device needs to determine L−1 target frequency domain locations in addition to determining the target frequency domain locations carrying the target synchronization signal blocks. If the total number of the target frequency domain locations that the terminal device needs to determine is L+1, then the terminal device needs to determine L target frequency domain locations in addition to determining the target frequency domain locations carrying the target synchronization signal blocks.

With reference to the second aspect and the foregoing implementations, in another implementation of the second aspect, receiving second configuration information, where the second configuration information includes at least one of the following: a bandwidth of the broadband component carrier, a center frequency point of the broadband component carrier, a value of S, a frequency interval of two adjacent first target frequency domain locations in the S first target frequency domain locations, and a distribution pattern of synchronization signal blocks;

where the determining, according to target frequency domain locations carrying the target synchronization signal blocks, other first target frequency domain locations for carrying other synchronization signal blocks includes: determining, according to the target frequency domain locations carrying the target synchronization signal blocks and the second configuration information, all of target frequency domain locations except the target frequency domain locations carrying the target synchronization signal blocks in the S target frequency domain locations.

With reference to the second aspect and the foregoing implementations, in another implementation of the second aspect, the distribution pattern of the synchronization signal blocks is used to indicate a frequency domain offset between synchronization signal blocks except the target synchronization signal blocks in the S synchronization signal blocks and the target synchronization signal blocks;

the determining, according to the target frequency domain locations carrying the target synchronization signal blocks and the second configuration information, all of target frequency domain locations except the target frequency domain locations carrying the target synchronization signal blocks in the S target frequency domain locations includes:

determining, according to the frequency domain locations of the target synchronization signal blocks and the frequency domain offset, all of target frequency domain locations except the target frequency domain locations carrying the target synchronization signal blocks in the S target frequency domain locations.

With reference to the second aspect and the foregoing implementations, in another implementation of the second aspect, the distribution pattern of the synchronization signal blocks includes a frequency value of the frequency domain offset or a number value corresponding to the frequency domain offset.

With respect to the second aspect and the foregoing implementations, in another implementation of the second aspect, the distribution pattern of the synchronization signal blocks is used to indicate a transmission period of each of synchronization signal blocks in the S synchronization signal blocks, and/or a time domain offset between synchronization signal blocks except the target synchronization signal blocks and the target synchronization signal blocks;

the method further includes:

determining a time domain location of the other synchronization signal blocks according to a time domain location occupied by the target synchronization signal blocks, and the transmission period of at least part of the synchronization signal blocks, and/or the time domain offset.

With reference to the second aspect and the foregoing implementations, in another implementation of the second aspect, the receiving second configuration information includes:

receiving the second configuration information corresponding to the target synchronization signal blocks. With reference to the second aspect and the foregoing implementations, in another implementation of the second aspect, the method further includes: receiving third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S;

where the determining, according to the target frequency domain locations carrying the target synchronization signal blocks and the first configuration information, other target frequency domain locations for carrying other synchronization signal blocks includes: determining, according to the target frequency domain locations carrying the target synchronization signal blocks, and the third configuration information, L or L−1 target frequency domain locations except the target frequency domain locations carrying the target synchronization signal blocks in the S target frequency domain locations.

With the second aspect and the foregoing implementations, in another implementation of the second aspect, in the case that the third configuration information includes the value L and the first configuration information is received, the third configuration information further includes numbers of L synchronization signal blocks corresponding to the value L.

With reference to the second aspect and the foregoing implementations, in another implementation of the second aspect, the numbers of L synchronization signal blocks corresponding to the value L are determined by a network device based on numbers of synchronization signal blocks reported by a terminal device.

With reference to the second aspect and the foregoing implementations, in another implementation of the second aspect, frequencies at the S target frequency domain locations are integer multiples of a synchronization signal frequency grid.

With reference to the second aspect and the foregoing implementations, in another implementation of the second aspect, the method further includes:

receiving fourth configuration information that is transmitted by a network device for the target synchronization signal blocks, where the fourth configuration information is used to indicate a frequency domain offset between other synchronization signal blocks in the S synchronization signal blocks and the target synchronization signal blocks;

the determining, according to the target frequency domain locations carrying the target synchronization signal blocks, all of target frequency domain locations except the target frequency domain locations carrying the target synchronization signal blocks in the S target frequency domain locations includes:

determining, according to the frequency domain locations of the target synchronization signal blocks, and a frequency domain offset of synchronization signal blocks except the target synchronization signal blocks with respect to the target synchronization signal blocks, all of the target frequency domain locations except the target frequency domain locations carrying the target synchronization signal blocks in the S target frequency domain locations.

With reference to the second aspect and the foregoing implementations, in another implementation of the second aspect, the fourth configuration information includes a number value corresponding to the frequency domain offset, or a frequency value of the frequency domain offset.

With reference to the second aspect and the foregoing implementations, in another implementation of the second aspect, the method further includes:

receiving fifth configuration information that is transmitted by a network device for the target synchronization signal blocks, where the fifth configuration information is used to indicate a transmission period of each of synchronization signal blocks in the S synchronization signal blocks, and/or a time domain offset between the synchronization signal blocks except the target synchronization signal blocks and the target synchronization signal blocks;

the method further includes:

determining a time domain location of the other synchronization signal blocks according to a time domain location occupied by the target synchronization signal blocks, and the transmission period of at least part of the synchronization signal blocks and/or the time domain offset.

With reference to the second aspect and the foregoing implementations, in another implementation of the second aspect, the method further includes:

receiving sixth configuration information transmitted by a network device, where the sixth configuration information is used to indicate a transmission period of each of synchronization signal blocks in the S synchronization signal blocks and/or a time domain offset between the S synchronization signal blocks;

the method further includes:

determining a time domain location of the other synchronization signal blocks according to a time domain location occupied by the target synchronization signal blocks, and the transmission period of each of the synchronization signal blocks and/or the time domain offset.

In a third aspect, a method for transmitting synchronization signal blocks is provided, including:

when target synchronization signal blocks in S synchronization signal blocks are received within a broadband component carrier, determining other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except the target frequency domain locations carrying the target synchronization signal blocks in the S target frequency domain locations, and each of the target frequency domain locations is used for carrying one synchronization signal block.

With reference to the third aspect, in a possible implementation of the third aspect, the determining other target frequency domain locations for carrying other synchronization signal blocks in S target frequency domain locations includes:

determining, according to configuration information corresponding to the target synchronization signal blocks, the other target frequency domain locations, where the configuration information carries a frequency value of a frequency point of the other synchronization signal blocks.

In a fourth aspect, a network device is provided for performing the method of the above first aspect or the method of any possible implementation of the first aspect. In particular, the network device includes functional modules for performing the method of the above first aspect or the method of any possible implementation of the first aspect.

In a fifth aspect, a terminal device is provided for performing the method of the above second aspect or any possible implementation of the second aspect, or the method of the above third aspect or any possible implementation of the third aspect. In particular, the terminal device includes functional modules for performing the method of the above second aspect or the method of any possible implementation of the second aspect.

In a sixth aspect, a network device is provided, including a processor, a memory, and a transceiver. The processor, the memory, and the transceiver communicate with each other through an internal connection path, and transmit control and/or data signals, such that the network device performs the method of the above first aspect or the method of any possible implementation of the above first aspect.

In a seventh aspect, a terminal device is provided, including a processor, a memory, and a transceiver. The processor, the memory, and the transceiver communicate with each other through an internal connection path, and transmit control and/or data signals, such that the terminal device performs the method of the above second aspect or the method of any possible implementation of the above second aspect, or the method of the above third aspect or the method of any possible implementation of the above third aspect.

In an eighth aspect, a computer readable medium is provided, where the computer readable medium is used to store a computer program, the computer program including instructions for performing the above first aspect or any of the possible implementations of the above first aspect.

In a ninth aspect, a computer readable medium is provided for storing a computer program, the computer program including instructions for performing the above second aspect or any possible implementation of the above second aspect, or the above third aspect or any possible implementation of the above third aspect.

In a tenth aspect, a computer program product including instructions is provided, and when a computer executes the instructions of the computer program product, the computer performs the method for transmitting synchronization signal blocks of the above first aspect or any possible implementation of the above first aspect. Specifically, the computer program product can be run on the network device of the above fourth aspect or the above sixth aspect.

In a eleventh aspect, a computer program product including instructions is provided, and when a computer executes the instructions of the computer program product, the computer performs the method for transmitting synchronization signal blocks of the above second aspect or any possible implementation of the above second aspect, or the above third aspect or any possible implementation of the above third aspect. Specifically, the computer program product can be run on the terminal device of the above fifth aspect or the above seventh aspect.

DESCRIPTION OF DRAWINGS

FIG. 1 is a schematic flow diagram of a method for transmitting synchronization signal blocks according to an embodiment of the present application.

FIG. 4 is a schematic flow diagram of a method for transmitting synchronization signal blocks according to another embodiment of the present application.

FIG. 5 is a schematic flow diagram of a method for transmitting synchronization signal blocks according to another embodiment of the present application.

DESCRIPTION OF EMBODIMENTS

Figure 2:
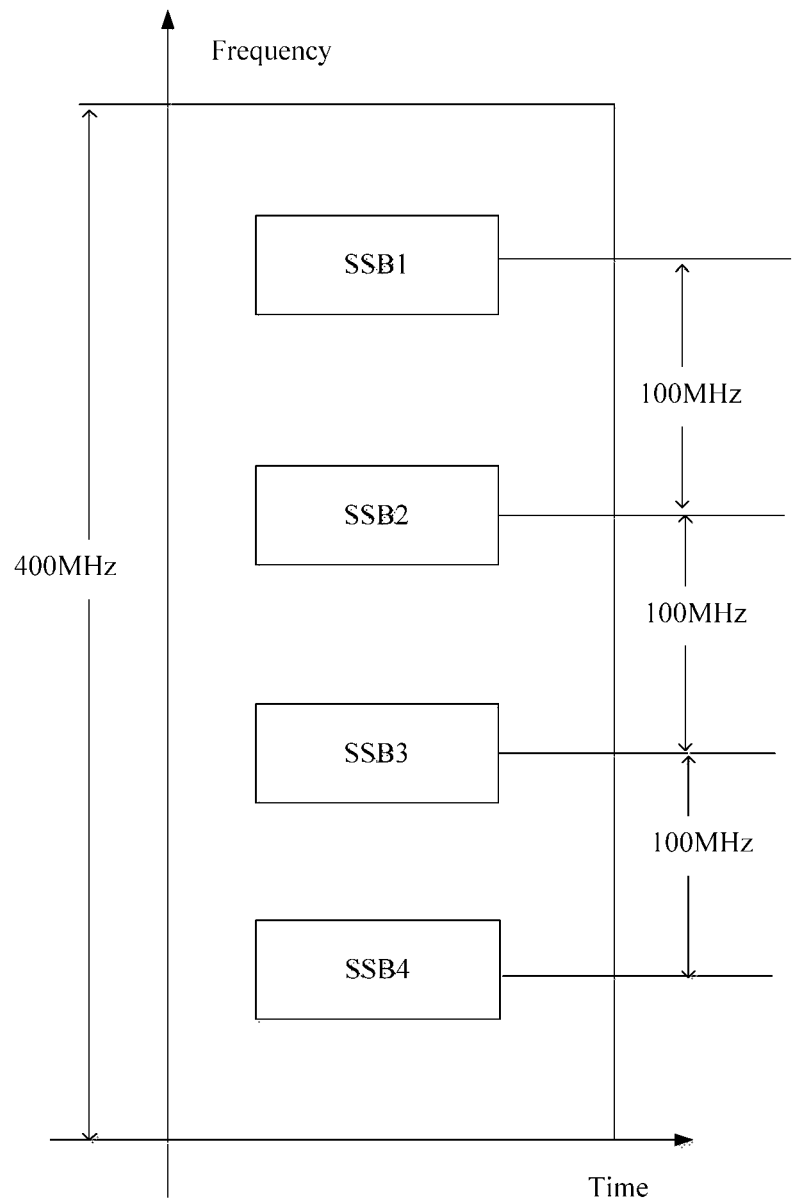
FIG. 2 is a schematic diagram of even distribution of synchronization signal blocks within a broadband component carrier according to an embodiment of the present application.

The technical solutions in the embodiments of the present application will be clearly and completely described in the following with reference to the accompanying drawings in the embodiments of the present application.

It should be understood that the technical solutions of the embodiments of the present application can be applied to various communication systems, such as the global system of mobile communication (GSM) system, a code division multiple access (CDMA) system, and a wideband code division multiple access (WCDMA) system, a general packet radio service (GPRS), a long term evolution (LTE) system, a LTE frequency division duplex (FDD) system, a LTE time division duplex (TDD) system, a universal mobile telecommunication system (UMTS) or a worldwide interoperability for microwave access (WiMAX) communication system, a 5G system, or a new radio (NR) system.

In the embodiment of the present application, the terminal device may include, but is not limited to, a mobile station (MS), a mobile terminal, a mobile telephone, a user equipment (UE), a handset, a portable equipment, a vehicle, etc., where the terminal device can communicate with one or more core networks via a radio access network (RAN), for example, the terminal device can be a mobile telephone (or called as a "cellular" telephone), computers with radio communication capabilities, etc., and the terminal device can also be a portable, pocket-sized, handheld, computer-integrated or in-vehicle mobile apparatus.

The network device involved in the embodiment of the present application is an apparatus deployed in a radio access network to provide a radio communication function for a terminal device. The network device may be a base station, and the base station may include various forms of macro base stations, micro base stations, relay stations, access points, etc. In systems with different radio access technologies, the names of devices with base station functionality may vary. For example, it is called an evolved NodeB, eNB or eNodeB in a LTE network, and a Node B in a 3rd generation (3G) network, etc.

FIG. 1 illustrates a method for transmitting synchronization signal blocks according to an embodiment of the present application. As shown in FIG. 1, the method 100 includes:

S110, determining M target frequency domain locations for carrying M synchronization signal blocks within a broadband component carrier, where each of the target frequency domain locations is used for carrying one synchronization signal block, and M is a positive integer greater than or equal to 1; and S120, transmitting the M synchronization signal blocks to a terminal device on the M target frequency domain locations.

It should be noted that the M target frequency domain locations in S110 need to be on a synchronization signal (SS) frequency grid. Alternatively, it can be understood that the frequencies at the M target frequency domain locations are integer multiples of the SS frequency grid. For example, if the SS frequency grid is 5 MHz, the M target frequency domain locations carrying the SS block need to be within the broadband component carrier and distributed on frequency points which are integer multiples of 5 MHz.

In an embodiment, before S110, the network device determines a value of M, or the network device determines the numbers of the synchronization signal (SS) blocks that need to be transmitted within the bandwidth component carrier.

Specifically, in some embodiments, the network device and the terminal device agree in advance, or specify a protocol that the numbers of synchronization signal blocks can be transmitted within a broadband component bandwidth, and the network device determines the value of M according to the numbers specified by the previous agreement or protocol. Alternatively, the network device determines the value of M according to the bandwidth of the broadband component carrier and the rule that the greater the bandwidth is, the greater the numbers of synchronization signal blocks that can be transmitted are.

Further, in some embodiments, the network device may determine the value of M based on a corresponding relationship between the bandwidth of the broadband component carrier and the numbers of SS blocks. The above corresponding relationship may be specified in advance in the protocol. Table 1 shows a corresponding relationship between the bandwidth of the broadband component carrier and the numbers of SS blocks. As shown in Table 1, if the bandwidth of the broadband component carrier is 1 GHz, the value of M is 8, and if the bandwidth of the broadband component carrier is 40 MHz, the value of M is 1.

TABLE 1

| Bandwidth of Broadband Component Carrier | Numbers of SS Blocks |
|---|---|
| 20, 40 MHz, 80 MHz | 1 |
| 200 MHz | 2 |
| 400 MHz | 4 |
| 1 GHz | 8 |

Specifically, in other embodiments, the network device determines the value of M according to the bandwidth of the broadband component carrier and an operation bandwidth supported by a terminal device accessing in the broadband component carrier, where the terminal device accessing in the broadband component carrier includes the terminal device.

For example, if the bandwidth of the broadband component carrier is 200 MHz, and only the terminal device that the operation bandwidth is 200 MHz accesses in the broadband component carrier, then the network device determines that the value of M is 1. However, if a terminal device that an operation bandwidth is 20 MHz and a terminal device that an operation bandwidth is 40 MHz also access in the broadband component carrier simultaneously, and the terminal device that an operation bandwidth is 20 MHz and the terminal device that an operation bandwidth is 40 MHz are allocated to different bandwidths of the broadband component carrier, then the network device can determine that the value of M is 5. Therefore, the network device needs to transmit 5 SS blocks on the broadband component carrier of 200 MHz, thereby it is convenient for these terminal devices that an operation bandwidth is smaller than the bandwidth of the broadband component carrier to obtain the time-frequency synchronization, read the physical broadcast channel (PBCH), and perform the radio resource management (RRM) measurements.

In an embodiment, in S110, the network device may determine M first frequency domain locations within the broadband component carrier as the M first target frequency domain locations, where the frequency interval between two adjacent first frequency domain locations within the M first frequency domain locations is a first target frequency interval. Alternatively, it can be understood that M synchronization signal blocks are evenly distributed in the broadband component carrier using a same frequency domain interval. The target frequency interval depends on the actual setting of the network device, for example, the target frequency interval is set by considering the factors, for example the interference of the neighboring cell, the actual transmission situation within the system, etc. And the target frequency interval herein is an integer multiple of the SS frequency grid. For example, it can be assumed that the SS frequency grid is 5 MHz, and the target frequency interval may be 10 MHz.

For example, as shown in FIG. 2, it is assumed that the target frequency interval is 100 MHz and the broadband component carrier bandwidth is 400 MHz, where four SS blocks are transmitted, thus the four SS blocks are evenly distributed at a frequency interval of 100 MHz within the bandwidth of the broadband component carrier.

Specifically, in some embodiments, the M first frequency domain locations are determined by the network device based on N second frequency domain locations, and a frequency interval between two adjacent second frequency domain locations in the N second frequency domain locations is a second target frequency interval, where N is a positive integer greater than or equal to M. For example, it is assumed that if there are eight second frequency domain locations evenly distributed at a frequency interval of 20 MHz in the broadband component carrier, the network device may select four consecutive second frequency domain locations from the eight second frequency domain locations as the target frequency domain locations. Alternatively the network device may determine four first frequency domain locations according to the eight second frequency domain locations, where the four first frequency domain locations are evenly distributed at a frequency interval of 40 MHz.

In an embodiment, in S110, the network device determines according to a distribution pattern of target synchronization signal blocks, the M target frequency domain locations, where the distribution pattern of the target synchronization signal blocks is used to indicate a frequency interval between two adjacent target frequency domain locations. The distribution pattern of the target synchronization signal blocks herein may be specified by a protocol or may be determined by a network device. In a case that the distribution pattern of the target synchronization signal blocks is determined by the network device, after the network device determines the distribution pattern of the target synchronization signal blocks, it transmits the determined distribution pattern of the target synchronization signal blocks to the terminal device.

For example, it is assumed that four SS blocks, i.e., SS block1, SS block2, SS block3, and SS block4 need to be transmitted within the broadband component carrier, and the distribution pattern of the target synchronization signal blocks indicates that the frequency interval between the frequency domain locations for carrying SS block 1 and SS block 2 is 80 MHz, and the frequency interval between the frequency domain locations for carrying SS block 2 and SS block 3 is 120 MHz, and the frequency interval between the frequency domain locations for carrying SS block 3 and SS block 4 is 100 MHz. Therefore, the four SS blocks are distributed within the broadband component carrier according to the pattern shown in FIG. 3, where the frequency interval between the frequency domain locations for carrying SS block 1 and SS block 2 is 80 MHz, and the frequency interval between the frequency domain locations for carrying SS block 2 and SS block 3 is 120 MHz, and the frequency interval between the frequency domain locations for carrying SS block 3 and SS block 4 is 100 MHz.

In the embodiment of the present application, multiple SS blocks within the broadband component carrier are evenly distributed or distributed according to a predefined distribution pattern, so that a frequency relative relationship between frequency domain locations carrying the SS block is determined. Therefore, once the terminal device searches any SS block, it can obtain frequency domain locations carrying other SS blocks according to the above determined frequency relative relationship, thus reducing the complexity for the terminal device to search for the other SS blocks for performing the time-frequency synchronization, reading the system information, and performing the RRM measurements.

In the embodiment of the present application, optionally, the network transmits the first configuration information to the terminal device, where the first configuration information is used to indicate a number of each of synchronization signal blocks in the M synchronization signal blocks on a frequency domain. For example, it is assumed that the network device transmits four SS blocks within the broadband component carrier with the numbers 1, 2, 3, and 4 respectively. The network device may indicate the number of each of SS blocks in the PBCH within the SS block; alternatively, the network device may indicate the number of each of SS blocks by using broadcast information (for example, remaining minimum system information (RMSI) or other system information (OSI)) that has a binding relationship with the SS blocks; alternatively, the network device notifies the terminal device of the number information of each of SS blocks on the frequency domain by using a radio resource control (RRC) message.

Correspondingly, after the terminal device learns the number of each of SS blocks on the frequency domain and when the terminal device searches an SS block, it may determine the frequency domain locations for carrying other SS blocks based on the frequency domain location carrying this searched SS block. For example, it is assumed that if the frequencies of the frequency domain locations carrying the SS blocks corresponding to the numbers 1-4 of the above four SS blocks increase in sequence, thus if the terminal device firstly detects the SS block that the number is 3, the terminal device can learn that the SS blocks that the numbers are 1 and 2 can be detected from the frequency domain location carrying the SS block that the number is 3 in a direction towards the low frequency direction, and the SS block that the number is 4 can be detected from the frequency domain location carrying the SS block that the number is 3 in a direction towards the high frequency.

Alternatively, if the terminal device learns that the bandwidth of the bandwidth component carrier and the above four SS blocks are evenly distributed within the broadband component carrier according to the first target frequency interval, then in a case that the terminal device firstly detects the SS block that the number is 3, the terminal device can learn that the SS block that the number is 2 can be detected at a frequency domain location that has the first target frequency interval separated from the frequency domain location carrying the SS block that the number is 3, the SS block that the number is 1 can be detected at a frequency domain location that has two first target frequency intervals separated from the frequency domain location carrying the SS block that the number is 3, and the SS block that the number is 4 can be detected at a frequency domain location that has the first target frequency interval separated from the frequency domain location carrying the SS block that the number is 3.

Alternatively, if the terminal device learns the distribution patterns of the above four SS blocks, i.e., the terminal device learns the frequency interval between two adjacent frequency domain locations in the frequency domain locations carrying the above four SS blocks, then after the terminal device detects any one of SS blocks, it may determine the frequency domain locations carrying the other three SS blocks based on the number of the detected SS block and the frequency interval between two adjacent frequency domain locations.

In an embodiment, the above bandwidth of the broadband component carrier, the numbers of SS blocks, the target frequency domain interval, and the distribution pattern of the SS block may be specified by a protocol, or notified by the network device to the terminal device by means of signaling. For example, the network device transmits the second configuration information to the terminal device by using a system broadcast message or RRC dedicated signaling (for example, message 4 (msg4)), where the second configuration information includes at least one of the following information: a bandwidth of the broadband component carrier, a center frequency point of the broadband component carrier, the numbers of SS blocks, the target frequency interval, and a distribution pattern of SS blocks.

Optionally, in the embodiment of the present application, the distribution pattern of the synchronization signal blocks is used to indicate a frequency domain offset between synchronization signal blocks except reference synchronization signal blocks in S synchronization signal blocks in the M synchronization signal blocks and the reference synchronization signal blocks.

Specifically, there may be one reference synchronization signal block in the distribution pattern of the synchronization signal blocks, where the distribution pattern of the synchronization signal blocks also indicates the offset of other synchronization signal blocks in the S synchronization signal blocks with respect to the reference synchronization signal blocks. When the terminal device receives the reference synchronization signal blocks, it may obtain the frequency domain locations occupied by the other synchronization signal blocks in the S synchronization signal blocks according to the frequency points of the reference synchronization signal blocks and the offset indicated by the distribution pattern of the synchronization signal blocks.

In an embodiment, the reference synchronization signal blocks may be a preset synchronization signal blocks.

In an embodiment, the network device transmits the corresponding second configuration information respectively for at least part of synchronization signal blocks in the M synchronization signal blocks, where reference synchronization signal blocks in the distribution pattern of the synchronization signal blocks in the second configuration information are synchronization signal blocks corresponding to the second configuration information.

In an embodiment, the second configuration information may be carried in a PBCH in a corresponding synchronization signal blocks, or may also be carried in system information (for example, RMSI or OSI) corresponding to the corresponding synchronization signal blocks.

In an embodiment, the distribution pattern of the synchronization signal blocks includes a frequency value of the frequency domain offset or a number value corresponding to the frequency domain offset.

It should be understood that although the above introduces that the distribution pattern of the synchronization signal blocks is based on the distribution pattern of the synchronization signal blocks of the frequency domain, yet the embodiment of the present application is not limited thereto, and the distribution pattern of the synchronization signal blocks of the embodiment of the present application may also be based on the time domain.

Specifically, the distribution pattern of the synchronization signal blocks is used to indicate a transmission period of each of synchronization signal blocks in the S synchronization signal blocks in the M synchronization signal blocks, and/or a time domain offset between synchronization signal blocks except reference synchronization signal blocks and the reference synchronization signal blocks. When the terminal device receives the reference synchronization signal blocks, it may obtain the frequency domain locations occupied by the other synchronization signal blocks in the S synchronization signal blocks according to the period and time domain location of the reference synchronization signal blocks and the transmission period of the other reference synchronization signal blocks indicated by the distribution pattern of the synchronization signal blocks, and/or the offset of the other synchronization signal blocks with respect to the reference synchronization signal blocks.

In an embodiment, in the case that the distribution pattern of the synchronization signal blocks is only used to indicate a transmission period of each of synchronization signal blocks in the S synchronization signal blocks in the M synchronization signal blocks rather than a time domain offset, the transmission period between S synchronization signal blocks may be a multiple relationship, and the time domain location may be the relationship of the subset and the set.

In an embodiment, in the case that the distribution pattern of the synchronization signal blocks is only used to indicate a time domain offset between the S synchronization signal blocks rather than the transmission period, the transmission period of the S synchronization signal blocks may be the same.

Therefore, in the embodiment of the present application, by indicating a transmission period of each of synchronization signal blocks in the S synchronization signal blocks, and/or a time domain offset between synchronization signal blocks except the reference synchronization signal blocks and the reference synchronization signal blocks, it can be realized that S synchronization signal blocks need not to be transmitted simultaneously.

In an embodiment, the S in the embodiment of the present application may be equal to M or less than M. In the case that S is smaller than M, it means that the network device only needs to notify the terminal device to detect at least part of synchronization signal blocks in the S synchronization signal blocks.

Optionally, in some embodiments, although the network device transmits M synchronization signal blocks within one broadband component carrier, yet the network device requires the terminal device to measure only a part of the M synchronization signal blocks. Under this circumstance, the network device transmits third configuration information to the terminal device, where the third configuration information includes at least one of the following: a bandwidth of the broadband component carrier, a center frequency point of the broadband component carrier, a value L, a frequency interval of two adjacent target frequency domain locations in the M target frequency domain locations, and a distribution pattern of synchronization signal blocks, where L is a positive integer less than M. After the terminal device receives the third configuration information, it may determine the numbers of synchronization signal blocks which needs to be measured according to the value L.

Further, in some embodiments, if the terminal device has learned the numbers of the multiple synchronization signal blocks on the frequency domain, and the third configuration information includes the value L, the network device further carries the numbers of L synchronization signal blocks corresponding to the value L in the third configuration information. For example, for the above four SS blocks, the value L in the third configuration information is 2, and the third configuration information includes the numbers 2 and 3. After the terminal device receives the third configuration information, if it firstly detects the synchronization signal blocks that the number is 2, the terminal device determines the target frequency domain locations carrying the synchronization signal blocks that the number is 3 only according to the target frequency domain locations carrying the synchronization signal blocks that the number is 2, and performs measurement on the synchronization signal blocks that the numbers are 2 and 3.

And further, in some embodiments, the number carried in the third configuration information is determined by the network device based on the number of the synchronization signal blocks reported by the terminal device. For example, the number of the synchronization signal blocks reported by the terminal device is 1, and the network device determines that the number carried in the third configuration information is 1, or the network device determines that the numbers carried in the third configuration information are 1 and 2. Herein the synchronization signal blocks corresponding to the number of the synchronization signal blocks reported by the terminal device may be synchronization signal blocks used by the terminal device for performing the time-frequency synchronization.

In an embodiment, the network device may transmit corresponding fourth configuration information respectively for at least part of synchronization signal blocks in the M synchronization signal blocks, where the fourth configuration information is used to indicate a frequency domain offset between other synchronization signal blocks in S synchronization signal blocks in the M synchronization signal blocks and synchronization signal blocks corresponding to the fourth configuration information.

In an embodiment, the fourth configuration information includes a number value corresponding to the frequency domain offset, or a frequency value of the frequency domain offset.

In an embodiment, the fourth configuration information may be carried in a PBCH in a corresponding synchronization signal blocks, or may also be carried in system information (for example, RMSI or OSI) corresponding to the corresponding synchronization signal blocks.

In an embodiment, the network device transmit corresponding fifth configuration information respectively for at least part of synchronization signal blocks in the M synchronization signal blocks, where the fifth configuration information is used to indicate a time domain offset between other synchronization signal blocks in S synchronization signal blocks in the M synchronization signal blocks and synchronization signal blocks corresponding to the fifth configuration information.

In an embodiment, the network device transmits sixth configuration information to the terminal device, where the sixth configuration information is used to indicate a transmission period of each of synchronization signal blocks in S synchronization signal blocks in the M synchronization signal blocks and/or a time domain offset between M synchronization signal blocks.

In an embodiment, in the case that the six configuration information is only used to indicate a transmission period of each of the S synchronization signal blocks rather than a time domain offset, the transmission period between S synchronization signal blocks may be a multiple relationship, and the time domain location may be the relationship of the subset and the set.

In an embodiment, in the case that the sixth configuration information is only used to indicate a time domain offset between the S synchronization signal blocks rather than the transmission period, the transmission period of the S synchronization signal blocks may be the same.

Therefore, in the embodiment of the present application, by indicating a transmission period of each of synchronization signal blocks in the S synchronization signal blocks, and/or a time domain offset between synchronization signal blocks except the reference synchronization signal blocks and the reference synchronization signal blocks, it can be realized that S synchronization signal blocks need not to be transmitted simultaneously.

In an embodiment, transmitting corresponding seventh configuration information respectively for at least part of synchronization signal blocks in the M synchronization signal blocks, where the seventh configuration information is used to indicate frequency values of the frequency points of other synchronization signal blocks except synchronization signal blocks corresponding to the seventh configuration information in S synchronization signal blocks in the M synchronization signal blocks.

Specifically, in a case that the network device transmits certain synchronization signal blocks, the frequency values of the frequency points occupied by the other synchronization signal blocks in the S synchronization signal blocks may be transmitted in the configuration information corresponding to the synchronization signal blocks, so that when the terminal device receives the configuration information of the synchronization signal blocks, it can learn the frequency points occupied by the other synchronization signal blocks, so as to perform detection on other synchronization signal blocks, where the configuration information may be a PBCH in the synchronization signal blocks or a RMSI or OSI corresponding to the synchronization signal blocks.

In an embodiment, the network device transmits eighth configuration information to the terminal device, where the eighth configuration information is used to indicate a frequency value of a frequency point of each of synchronization signal blocks in the S synchronization signal blocks.

Specifically, the network device may broadcast a frequency value of a frequency point of each of synchronization signal blocks in the S synchronization signal blocks, so that when the terminal device receives the broadcast message, it can learn the frequency points occupied by the S synchronization signal blocks, so as to perform the detection on the S synchronization signal blocks.

In an embodiment, the S in the embodiment of the present application may be equal to M or less than M. In the case that S is smaller than M, it means that the network device only needs to notify the terminal device to detect at least part of the synchronization signal blocks in the S synchronization signal blocks.

Optionally, in the embodiment of the present application, the frequency point or frequency domain location of the SSB is any one of the frequency points carrying the SSB, for example, may be the center frequency point of the SSB, or a frequency point corresponding to the smallest physical resource block (PRB) or a frequency point corresponding to the largest PRB, etc. In an embodiment, the configuration information referred to in the embodiment of the present application may be a radio resource control (RRC) dedicated signaling, a RMSI or an OSI.

Figure 3:
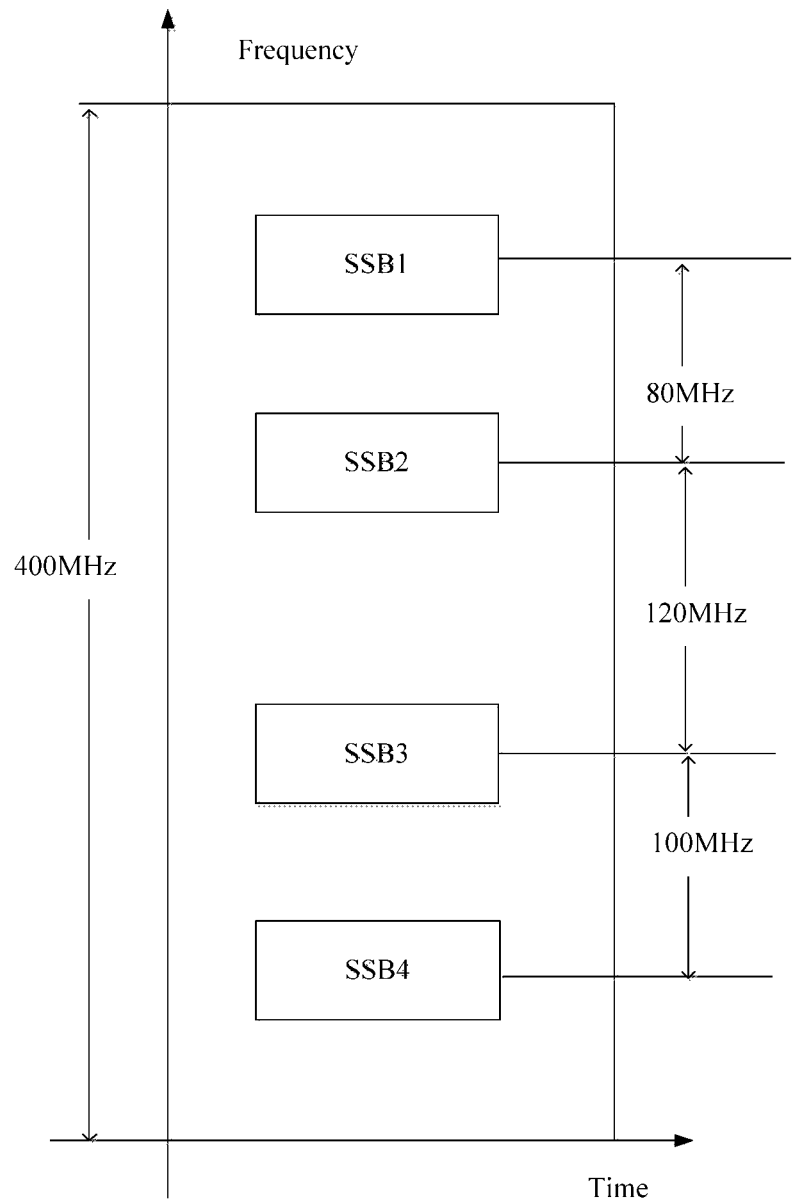
FIG. 3 is a schematic diagram of distribution of synchronization signal blocks within a broadband component carrier according to another embodiment of the present application.

A method for transmitting synchronization signal blocks according to an embodiment of the present application is described in detail above from the perspective of the network device side with reference to FIG. 1 to FIG. 3, and a method for transmitting synchronization signal blocks according to an embodiment of the present application will be described in detail below from the terminal device side with reference to FIG. 4. It should be understood that the interaction between the network device and the terminal device described from the perspective of the terminal device side is the same as that described from the network device side. To avoid repetition, the related description is omitted as appropriate.

FIG. 4 illustrates a method of transmitting synchronization signal blocks according to another embodiment of the present application. As shown in FIG. 4, the method 200 includes:

S210, when target synchronization signal blocks in S synchronization signal blocks are received within a broadband component carrier, determining, according to target frequency domain locations carrying the target synchronization signal blocks, other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block.

Therefore, according to the method for transmitting synchronization signal blocks of the present application, the terminal device, according to the target frequency domain locations carrying the detected target synchronization signal blocks, can determine frequency domain locations of other synchronization signal blocks in the same broadband component carrier as the detected synchronization signal blocks.

In an embodiment, the network device may not specifically indicate the specific frequency domain location of each of synchronization signal blocks to the terminal device, thus reducing the signaling overhead.

In the embodiment of the present application, optionally, a frequency interval between two adjacent target frequency domain locations in the S target frequency domain locations is a first target frequency interval;

where the S210 is specifically: determining, according to the target frequency domain locations carrying the target synchronization signal blocks and the target frequency interval, the other target frequency domain locations.

In the embodiment of the present application, optionally, the first target frequency interval is an integer multiple of a synchronization signal frequency grid.

In the embodiment of the present application, optionally, the S target frequency domain locations are determined based on N second frequency domain locations, and a frequency interval between two adjacent second frequency domain locations in the N second frequency domain locations is a second target frequency interval, where N is a positive integer greater than or equal to S.

In the embodiment of the present application, optionally, the S210 is specifically: determining the other target frequency domain locations according to the target frequency domain locations carrying the target synchronization signal blocks and a distribution pattern of target synchronization signal blocks, where the distribution pattern of the target synchronization signal blocks is used to indicate a frequency interval between two adjacent target frequency domain locations.

In the embodiment of the present application, optionally, the frequency interval between the two adjacent target frequency domain locations is an integer multiple of a synchronization signal frequency grid.

In the embodiment of the present application, optionally, the method 200 further includes: receiving first configuration information, where the first configuration information is used to indicate a number of each of synchronization signal blocks in the S synchronization signal blocks on a frequency domain;

where the S210 is specifically: determining, according to the target frequency domain locations carrying the target synchronization signal blocks and the first configuration information, the other target frequency domain locations.

In the embodiment of the present application, optionally, the method 200 further includes: receiving second configuration information, where the second configuration information includes at least one of the following: a bandwidth of the broadband component carrier, a center frequency point of the broadband component carrier, a value of S, a frequency interval of two adjacent target frequency domain locations in the S target frequency domain locations, and a distribution pattern of synchronization signal blocks;

where the S210 is specifically: determining, according to the target frequency domain locations carrying the target synchronization signal blocks, the first configuration information and the second configuration information, all of target frequency domain locations except the target frequency domain locations carrying the target synchronization signal blocks in the S target frequency domain locations.

In the embodiment of the present application, optionally, the method 200 further includes: receiving third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S;

where the S210 is specifically: determining, according to the target frequency domain locations carrying the target synchronization signal blocks, the first configuration information and the third configuration information, L or L−1 target frequency domain locations except the target frequency domain locations carrying the target synchronization signal blocks in the S target frequency domain locations.

In the embodiment of the present application, optionally, the method 200 further includes: receiving second configuration information, where the second configuration information includes at least one of the following: a bandwidth of the broadband component carrier, a center frequency point of the broadband component carrier, a value of S, a frequency interval of two adjacent target frequency domain locations in the S target frequency domain locations, and a distribution pattern of synchronization signal blocks;

where the S210 is specifically: determining, according to the target frequency domain locations carrying the target synchronization signal blocks and the second configuration information, all of target frequency domain locations except the target frequency domain locations carrying the target synchronization signal blocks in the S target frequency domain locations.

In an embodiment, the distribution pattern of the synchronization signal blocks is used to indicate a frequency domain offset between synchronization signal blocks except the target synchronization signal blocks in the S synchronization signal blocks and the target synchronization signal blocks; the terminal device determines, according to the frequency domain locations of the target synchronization signal blocks and the frequency domain offset, all of the target frequency domain locations except the target frequency domain locations carrying the target synchronization signal blocks in the S target frequency domain locations.

In an embodiment, the distribution pattern of the synchronization signal blocks includes a frequency value of the frequency domain offset or a number value corresponding to the frequency domain offset.

In an embodiment, the distribution pattern of the synchronization signal blocks is used to indicate a transmission period of each of synchronization signal blocks in the S synchronization signal blocks, and/or a time domain offset between synchronization signal blocks except the target synchronization signal blocks and the target synchronization signal blocks. And the terminal device determines a time domain location of the other synchronization signal blocks according to a time domain location occupied by the target synchronization signal blocks, and the transmission period of at least part of the synchronization signal blocks, and/or the time domain offset.

In an embodiment, the terminal device receives the second configuration information corresponding to the target synchronization signal blocks. In the embodiment of the present application, optionally, the method 200 further includes: receiving third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S;

where the S210 specifically includes: determining, according to the target frequency domain locations carrying the target synchronization signal blocks and the third configuration information, L or L−1 target frequency domain locations except the target frequency domain locations carrying the target synchronization signal blocks in the S target frequency domain locations.

In the embodiment of the present application, optionally, in the case that the third configuration information includes the value L and the first configuration information is received, the third configuration information further includes numbers of L synchronization signal blocks corresponding to the value L.

In the embodiment of the present application, optionally, the numbers of L synchronization signal blocks corresponding to the value L are determined by a network device based on numbers of the synchronization signal blocks reported by a terminal device.

In the embodiment of the present application, optionally, frequencies at the S target frequency domain locations are integer multiples of a synchronization signal frequency grid.

In an embodiment, the terminal device receives fourth configuration information which is transmitted by a network device for the target synchronization signal blocks, where the fourth configuration information is used to indicate a frequency domain offset between other synchronization signal blocks in the S synchronization signal blocks and the target synchronization signal blocks; and terminal device determines, according to the frequency domain locations of the target synchronization signal blocks, and a frequency domain offset of synchronization signal blocks except the target synchronization signal blocks with respect to the target synchronization signal blocks, all of the target frequency domain locations except the target frequency domain locations carrying the target synchronization signal blocks in the S target frequency domain locations.

In an embodiment, the fourth configuration information includes a number value corresponding to the frequency domain offset, or a frequency value of the frequency domain offset.

In an embodiment, the terminal device receives fifth configuration information which is transmitted by a network device for the target synchronization signal blocks, where the fifth configuration information is used to indicate a transmission period of each of synchronization signal blocks in the S synchronization signal blocks, and/or a time domain offset between the synchronization signal blocks except the target synchronization signal blocks and the target synchronization signal blocks; and the terminal device determines a time domain location of the other synchronization signal blocks according to a time domain location occupied by the target synchronization signal blocks, and the transmission period of at least part of the synchronization signal blocks, and/or the time domain offset.

In an embodiment, the terminal device receives sixth configuration information transmitted by a network device, where the sixth configuration information is used to indicate a transmission period of each of synchronization signal blocks in the S synchronization signal blocks and/or a time domain offset between the S synchronization signal blocks; and the terminal device determines a time domain location of the other synchronization signal blocks according to a time domain location occupied by the target synchronization signal blocks, and the transmission period of each of the synchronization signal blocks, and/or the time domain offset.

FIG. 5 illustrates a method of transmitting synchronization signal blocks according to another embodiment of the present application. As shown in FIG. 5, the method 300 includes:

in S310, when target synchronization signal blocks in the S synchronization signal blocks are received within a broadband component carrier, determining other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except the target frequency domain locations carrying the target synchronization signal blocks in the S target frequency domain locations, and each of the target frequency domain locations is used for carrying one synchronization signal block.

In an embodiment, determining, according to configuration information corresponding to the target synchronization signal blocks, the other target frequency domain locations, where the configuration information carries a frequency value of a frequency point of the other synchronization signal blocks.

Figure 6:
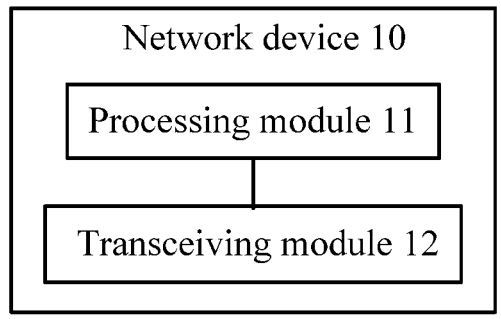
FIG. 6 is a schematic block diagram of a network device according to an embodiment of the present application.

The method of transmitting synchronization signal blocks according to an embodiment of the present application has been described in detail above with reference to FIG. 1 to FIG. 5. A network device according to an embodiment of the present application will be described in detail below with reference to FIG. 6. As shown in FIG. 6, the network device 10 includes:

a processing module 11, configured to determine M target frequency domain locations for carrying M synchronization signal blocks within a broadband component carrier, where each of the target frequency domain locations is used for carrying one synchronization signal block, and M is a positive integer greater than or equal to 1; and a transceiving module 12, configured to transmit the M synchronization signal blocks to a terminal device on the M target frequency domain locations.

Therefore, the network device according to the embodiment of the present application determines multiple frequency domain locations for carrying multiple synchronization signal blocks within the broadband component carrier, and transmits the multiple synchronization signal blocks to the terminal device on the multiple frequency domain locations, which can implement the transmission of multiple synchronization signal blocks within one broadband component carrier and meet requirements of the new radio communication system.

In the embodiment of the present application, optionally, the processing module 11 is further configured to: determine a value of M according to a bandwidth of the broadband component carrier.

In the embodiment of the present application, optionally, the processing module 11 is specifically configured to: determine the value of M according to the bandwidth of the broadband component carrier and an operation bandwidth supported by a terminal device accessing in the broadband component carrier, where the terminal device accessing in the broadband component carrier includes the terminal device.

In the embodiment of the present application, optionally, the processing module 11 is specifically configured to: determine M first frequency domain locations within the broadband component carrier as the M target frequency domain locations, where a frequency interval between two adjacent first frequency domain locations within the M first frequency domain locations is a first target frequency interval.

In the embodiment of the present application, optionally, the first target frequency interval is an integer multiple of a synchronization signal frequency grid.

In the embodiment of the present application, optionally, the M first frequency domain locations are determined based on N second frequency domain locations, and a frequency interval between two adjacent second frequency domain locations in the N second frequency domain locations is a second target frequency interval, where N is a positive integer greater than or equal to M.

In the embodiment of the present application, optionally, the processing module 11 is specifically configured to: determine, according to a distribution pattern of target synchronization signal blocks, the M target frequency domain locations, where the distribution pattern of the target synchronization signal blocks is used to indicate a frequency interval between two adjacent target frequency domain locations.

In the embodiment of the present application, optionally, the frequency interval between the two adjacent target frequency domain locations is an integer multiple of a synchronization signal frequency grid.

In the embodiment of the present application, optionally, the transceiving module 12 is further configured to transmit first configuration information to the terminal device, where the first configuration information is used to indicate a number of each of synchronization signal blocks in the M synchronization signal blocks on a frequency domain.

In the embodiment of the present application, optionally, the transceiving module 12 is further configured to transmit second configuration information, to the terminal device, where the second configuration information includes at least one of the following: a bandwidth of the broadband component carrier, a center frequency point of the broadband component carrier, a value of M, a frequency interval of two adjacent target frequency domain locations in the M target frequency domain locations, and a distribution pattern of synchronization signal blocks.

In an embodiment, the distribution pattern of the synchronization signal blocks is used to indicate a frequency domain offset between synchronization signal blocks except reference synchronization signal blocks in S synchronization signal blocks in the M synchronization signal blocks and the reference synchronization signal blocks.

In an embodiment, the distribution pattern of the synchronization signal blocks includes a frequency value of the frequency domain offset or a number value corresponding to the frequency domain offset.

In an embodiment, the distribution pattern of the synchronization signal blocks is used to indicate a transmission period of each of synchronization signal blocks in S synchronization signal blocks in the M synchronization signal blocks, and/or a time domain offset between synchronization signal blocks except reference synchronization signal blocks and the reference synchronization signal blocks.

In an embodiment, the transceiving module 12 is further configured to:

transmit the corresponding second configuration information respectively for at least part of synchronization signal blocks in the M synchronization signal blocks, where reference synchronization signal blocks in the distribution pattern of the synchronization signal blocks in the second configuration information are synchronization signal blocks corresponding to the second configuration information.

In the embodiment of the present application, optionally, the transceiving module 12 is further configured to transmit third configuration information to the terminal device, where the third configuration information includes at least one of the following: a bandwidth of the broadband component carrier, a center frequency point of the broadband component carrier, a value L, a frequency interval of two adjacent target frequency domain locations in the M target frequency domain locations, and a distribution pattern of synchronization signal blocks, where L is a positive integer less than M.

In the embodiment of the present application, optionally, in the case that the third configuration information includes the value L and transmitting the first configuration information to the terminal device, the third configuration information further includes the numbers of L synchronization signal blocks corresponding to the value L.

In the embodiment of the present application, optionally, the numbers of the L synchronization signal blocks corresponding to the value L are determined by the network device based on numbers of synchronization signal blocks reported by the terminal device.

In the embodiment of the present application, optionally, frequencies at the M target frequency domain locations are integer multiples of a synchronization signal frequency grid.

In an embodiment, the transceiving module 12 is further configured to:

transmit corresponding fourth configuration information respectively for at least part of synchronization signal blocks in the M synchronization signal blocks, where the fourth configuration information is used to indicate a frequency domain offset between other synchronization signal blocks in S synchronization signal blocks in the M synchronization signal blocks and synchronization signal blocks corresponding to the fourth configuration information.

In an embodiment, the fourth configuration information includes a number value corresponding to the frequency domain offset, or a frequency value of the frequency domain offset.

In an embodiment, the transceiving module 12 is further configured to:

transmit corresponding fifth configuration information respectively for at least part of synchronization signal blocks in the M synchronization signal blocks, where the fifth configuration information is used to indicate a time domain offset between other synchronization signal blocks in S synchronization signal blocks in the M synchronization signal blocks and synchronization signal blocks corresponding to the fifth configuration information.

In an embodiment, the transceiving module 12 is further configured to:

transmit sixth configuration information to the terminal device, where the sixth configuration information is used to indicate a transmission period of each of synchronization signal blocks in S synchronization signal blocks in the M synchronization signal blocks and/or a time domain offset between the M synchronization signal blocks.

In an embodiment, the transceiving module 12 is further configured to:

transmit corresponding seventh configuration information respectively for at least part of synchronization signal blocks in the M synchronization signal blocks, where the seventh configuration information is used to indicate frequency values of frequency points of other synchronization signal blocks except synchronization signal blocks corresponding to the seventh configuration information in S synchronization signal blocks in the M synchronization signal blocks.

In an embodiment, the transceiving module 12 is further configured to:

transmit eighth configuration information to the terminal device, where the eighth configuration information is used to indicate a frequency value of a frequency point of each of synchronization signal blocks in S synchronization signal blocks in the M synchronization signal blocks.

As for the network device according to the embodiment of the present application, reference may be made to the process of the method 100 corresponding to the embodiment of the present application. In addition, each unit/module in the network device and the other operations and/or functions described above are respectively used to implement the corresponding processes in the method 100, and are not described herein for brevity.

Figure 7:
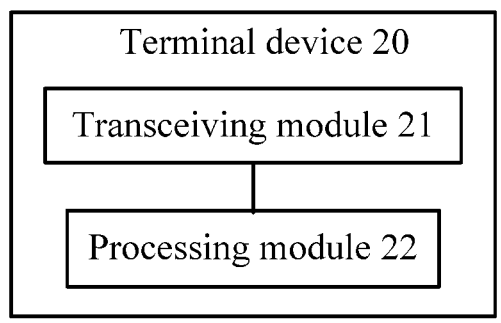
FIG. 7 is a schematic block diagram of a terminal device according to an embodiment of the present application.

FIG. 7 is a terminal device according to an embodiment of the present application. As shown in FIG. 7, the terminal device 20 includes a transceiving module 21 and a processing module 22.

In an embodiment, the transceiving module 21 is configured to receive synchronization signal blocks within the broadband component carrier; the processing module 22 is configured to, when target synchronization signal blocks in S synchronization signal blocks are received within the broadband component carrier, determine, according to target frequency domain locations carrying the target synchronization signal blocks, other target frequency domain locations for carrying other synchronization signal blocks in S target frequency domain locations, where the other synchronization signal blocks are part or all of synchronization signal blocks except the target synchronization signal blocks in the S synchronization signal blocks, and the other target frequency domain locations are part or all of target frequency domain locations except the target frequency domain locations carrying the target synchronization signal blocks in the S target frequency domain locations, and each of the target frequency domain locations is used for carrying one synchronization signal block.

Therefore, the terminal device according to the embodiment of the present application, according to the target frequency domain locations carrying the detected target synchronization signal blocks, can determine frequency domain locations of other synchronization signal blocks in the same broadband component carrier as the detected synchronization signal blocks. Thereby, the network device does not need to specifically indicate the specific frequency domain location of each of synchronization signal blocks to the terminal device, thus reducing the signaling overhead.

In the embodiment of the present application, optionally, a frequency interval between two adjacent target frequency domain locations in the S target frequency domain locations is a first target frequency interval;

where the processing module 22 is specifically configured to: determine, according to the target frequency domain locations carrying the target synchronization signal blocks and the first target frequency interval, the other frequency domain locations.

In the embodiment of the present application, optionally, the first target frequency interval is an integer multiple of a synchronization signal frequency grid.

In the embodiment of the present application, optionally, the S target frequency domain locations are determined based on N second frequency domain locations, and a frequency interval between two adjacent second frequency domain locations in the N second frequency domain locations is a second target frequency interval, where N is a positive integer greater than or equal to S.

In the embodiment of the present application, optionally, the processing module 22 is specifically configured to: determine the other target frequency domain locations according to the target frequency domain locations carrying the target synchronization signal blocks and a distribution pattern of target synchronization signal blocks, where the distribution pattern of the target synchronization signal blocks is used to indicate a frequency interval between two adjacent target frequency domain locations.

In the embodiment of the present application, optionally, the frequency interval between the two adjacent target frequency domain locations is an integer multiple of a synchronization signal frequency grid.

In the embodiment of the present application, optionally, the transceiving module 21 is further configured to receive first configuration information, where the first configuration information is used to indicate a number of each of synchronization signal blocks in the S synchronization signal blocks on a frequency domain;

where the processing module 22 is specifically configured to: determine, according to the target frequency domain locations carrying the target synchronization signal blocks and the first configuration information, the other target frequency domain locations.

In the embodiment of the present application, optionally, the transceiving module 21 is further configured to: receive second configuration information, where the second configuration information includes at least one of the following: a bandwidth of the broadband component carrier, a center frequency point of the broadband component carrier, a value of S, a frequency interval of two adjacent target frequency domain locations in the S target frequency domain locations, and a distribution pattern of synchronization signal blocks;

where the processing module 22 is specifically configured to: determine, according to the target frequency domain locations carrying the target synchronization signal blocks, the first configuration information and the second configuration information, all of target frequency domain locations except the target frequency domain locations carrying the target synchronization signal blocks in the S target frequency domain locations.

In the embodiment of the present application, optionally, the transceiving module 21 is further configured to: receive third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S;

where the processing module 22 is specifically configured to: determine, according to the target frequency domain locations carrying the target synchronization signal blocks, the first configuration information and the third configuration information, L or L−1 target frequency domain locations except the target frequency domain locations carrying the target synchronization signal blocks in the S target frequency domain locations.

In the embodiment of the present application, optionally, the transceiving module 21 is further configured to receive second configuration information, where the second configuration information includes at least one of the following: a bandwidth of the broadband component carrier, a center frequency point of the broadband component carrier, a value of S, a frequency interval of two adjacent first target frequency domain locations in the S first target frequency domain locations, and a distribution pattern of synchronization signal blocks;

where the processing module 22 is specifically configured to: determine, according to the target frequency domain locations carrying the target synchronization signal blocks and the second configuration information, all of target frequency domain locations except the target frequency domain locations carrying the target synchronization signal blocks in the S target frequency domain locations.

In an embodiment, the distribution pattern of the synchronization signal blocks is used to indicate a frequency domain offset between synchronization signal blocks except the target synchronization signal blocks in the S synchronization signal blocks and the target synchronization signal blocks;

the processing module 22 is further configured to:

determine, according to the frequency domain locations of the target synchronization signal blocks, and the frequency domain offset, all of target frequency domain locations except the target frequency domain locations carrying the target synchronization signal blocks in the S target frequency domain locations.

In an embodiment, the distribution pattern of the synchronization signal blocks includes a frequency value of the frequency domain offset or a number value corresponding to the frequency domain offset.

In an embodiment, the distribution pattern of the synchronization signal blocks is used to indicate a transmission period of each of synchronization signal blocks in the S synchronization signal blocks and/or a time domain offset between synchronization signal blocks except the target synchronization signal blocks and the target synchronization signal blocks, the processing module 22 is further configured to:

determine a time domain location of the other synchronization signal blocks according to a time domain location occupied by the target synchronization signal blocks, and the transmission period of at least part of the synchronization signal blocks, and/or the time domain offset.

In an embodiment, the transceiving module 21 is further configured to:

receive the second configuration information corresponding to the target synchronization signal blocks.

In the embodiment of the present application, optionally, the transceiving module 21 is further configured to receive third configuration information, where the third configuration information includes at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, where L is a positive integer less than S;

where the processing module 22 is specifically configured to: determine, according to the target frequency domain locations carrying the target synchronization signal blocks and the third configuration information, L or L−1 target frequency domain locations except the target frequency domain locations carrying the target synchronization signal blocks in the S target frequency domain locations.

In the embodiment of the present application, optionally, in a case that the third configuration information includes the value L and the first configuration information is received, the third configuration information further includes numbers of L synchronization signal blocks corresponding to the value L.

In the embodiment of the present application, optionally, the numbers of L synchronization signal blocks corresponding to the value L are determined by a network device based on numbers of the synchronization signal blocks reported by the terminal device.

In the embodiment of the present application, optionally, frequencies at the S target frequency domain locations are integer multiples of a synchronization signal frequency grid.

In an embodiment, the transceiving module 21 is further configured to:

receive fourth configuration information which is transmitted by a network device for the target synchronization signal blocks, where the fourth configuration information is used to indicate a frequency domain offset between other synchronization signal blocks in the S synchronization signal blocks and the target synchronization signal blocks;

the processing module 22 is further configured to:

determine, according to the frequency domain locations of the target synchronization signal blocks, and a frequency domain offset of synchronization signal blocks except the target synchronization signal blocks with respect to the target synchronization signal blocks, all of the target frequency domain locations except the target frequency domain locations carrying the target synchronization signal blocks in the S target frequency domain locations.

In an embodiment, the fourth configuration information includes a number value corresponding to the frequency domain offset, or a frequency value of the frequency domain offset.

In an embodiment, the transceiving module 21 is further configured to:

receive fifth configuration information which is transmitted by a network device for the target synchronization signal blocks, where the fifth configuration information is used to indicate a transmission period of each of synchronization signal blocks in the S synchronization signal blocks, and/or a time domain offset between the synchronization signal blocks except the target synchronization signal blocks and the target synchronization signal blocks;

the processing module 22 is further configured to:

determine a time domain location of the other synchronization signal blocks according to a time domain location occupied by the target synchronization signal blocks, and the transmission period of at least part of the synchronization signal blocks, and/or the time domain offset.

In an embodiment, the transceiving module 21 is further configured to:

receive sixth configuration information transmitted by a network device, where the sixth configuration information is used to indicate a transmission period of each of synchronization signal blocks in the S synchronization signal blocks and/or a time domain offset between the S synchronization signal blocks;

the transceiving module 22 is further configured to:

determine a time domain location of the other synchronization signal blocks according to a time domain location occupied by the target synchronization signal blocks, and the transmission period of each of the synchronization signal blocks, and/or the time domain offset.

As for the terminal device according to the embodiment of the present application, reference may be made to the process of the method 200 corresponding to the embodiment of the present application. In addition, each unit/module in the terminal device and the other operations and/or functions described above are respectively used to implement the corresponding processes in the method 200, and are not described herein for brevity.

In an embodiment, the transceiving module 21 is configured to receive synchronization signal blocks within a broadband component carrier;

the processing module 22 is configured to: when target synchronization signal blocks in the S synchronization signal blocks are received within the broadband component carrier, determine other target frequency domain locations for carrying other synchronization signal blocks in S target frequency domain locations, wherein the other synchronization signal blocks are part or all of the synchronization signal blocks except the target synchronization signal blocks in the S synchronization signal blocks, and the other target frequency domain locations are part or all of the target frequency domain locations except the target frequency domain locations carrying the target synchronization signal blocks in the S target frequency domain locations, and each of the target frequency domain locations is used for carrying one synchronization signal block.

In an embodiment, the processing module 22 is further configured to:

determine, according to configuration information corresponding to the target synchronization signal blocks, the other target frequency domain locations, where the configuration information carries frequency values of frequency points of the other synchronization signal blocks.

As for the terminal device according to the embodiment of the present application, reference may be made to the process of the method 300 corresponding to the embodiment of the present application. In addition, each unit/module in the terminal device and the other operations and/or functions described above are respectively used to implement the corresponding processes in the method 300, and are not described herein for brevity.

Figure 8:
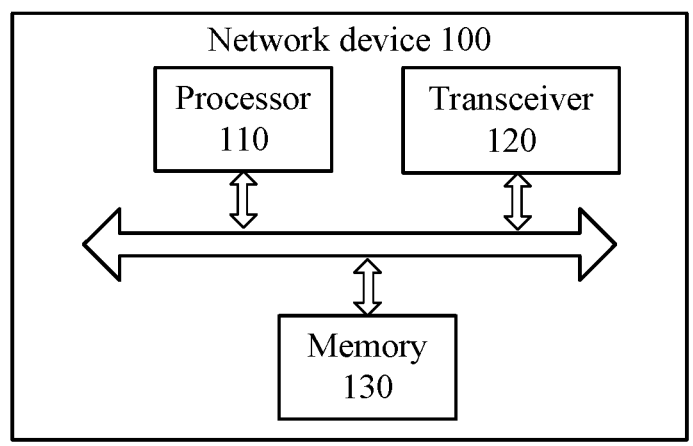
FIG. 8 is a schematic block diagram of a network device according to another embodiment of the present application.

FIG. 8 illustrates a network device according to another embodiment of the present application. As shown in FIG. 8, the network device 100 includes a processor 110 and a transceiver 120. The processor 110 is coupled to the transceiver 120. In an embodiment, the network device 100 further includes a memory 130 which is connected to the processor 110. Where the processor 110, the memory 130, and the transceiver 120 can communicate with each other through an internal connection path. Where the processor 110 is configured to determine M target frequency domain locations for carrying M synchronization signal blocks within a broadband component carrier, where each of the target frequency domain locations is used for carrying one synchronization signal block, and M is a positive integer greater than or equal to 1; and the transceiver 120 is configured to transmit the M synchronization signal blocks to a terminal device on the M target frequency domain locations.

Therefore, the network device according to the embodiment of the present application determines multiple frequency domain locations for carrying multiple synchronization signal blocks within the broadband component carrier, and transmits the multiple synchronization signal blocks to the terminal device on the multiple frequency domain locations, which can implement the transmission of multiple synchronization signal blocks within one broadband component carrier and meet requirements of the new radio communication system.

As for the network device 100 according to the embodiment of the present application, reference may be made to the network device 10 corresponding to the embodiment of the present application. In addition, each unit/module in the network device and the other operations and/or functions described above are respectively used to implement the corresponding processes in the method 100, and are not described herein for brevity.

Figure 9:
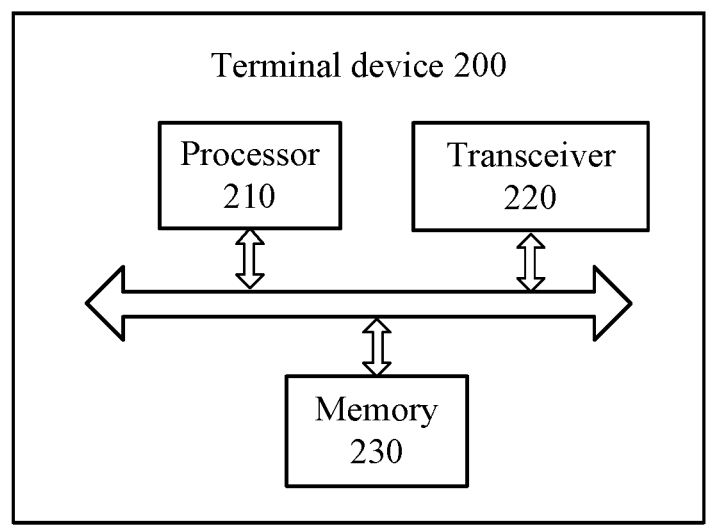
FIG. 9 is a schematic block diagram of a terminal device according to another embodiment of the present application.

FIG. 9 illustrates a schematic block diagram of a terminal device according to another embodiment of the present application. As shown in FIG. 9, the terminal device 200 includes: a processor 210 and a transceiver 220, where the processor 210 is coupled to the transceiver 220. In an embodiment, the terminal device 200 further includes a memory 230 which is connected to the processor 210. Where the processor 210, the memory 230, and the transceiver 220 can communicate with each other through an internal connection path. Where the transceiver 220 is configured to receive synchronization signal blocks within the broadband component carrier; the processor 210 is configured to, when the target synchronization signal blocks in the M synchronization signal blocks are received within the broadband component carrier, determining, according to the target frequency domain locations carrying the target synchronization signal blocks, other target frequency domain locations for carrying other synchronization signal blocks in the M target frequency domain locations, where the other synchronization signal blocks are part or all of synchronization signal blocks in the M synchronization signal blocks except the target synchronization signal blocks, and the other target frequency domain locations are part or all of target frequency domain locations except the target frequency domain locations carrying the target synchronization signal blocks in the M target frequency domain locations, and each of the target frequency domain locations is used for carrying one synchronization signal block.

Therefore, the terminal device according to the embodiment of the present application, according to the target frequency domain locations carrying the detected target synchronization signal blocks, can determine frequency domain locations of other synchronization signal blocks in the same broadband component carrier as the detected synchronization signal blocks. Thereby, the network device does not need to specifically indicate the specific frequency domain location of each of synchronization signal blocks to the terminal device, thus reducing the signaling overhead.

As for the terminal device 200 according to the embodiment of the present application, reference may be made to the terminal device 20 corresponding to the embodiment of the present application. In addition, each unit/module in the terminal device and the other operations and/or functions described above are respectively used to implement the corresponding processes in the method 200, and are not described herein for brevity.

It should be understood that the processor of the embodiment of the present application may be an integrated circuit chip with signal processing capability. In the implementation process, each step of the foregoing method embodiments may be completed by an integrated logic circuit of hardware in a processor or instructions in a form of software. The above processor may be a general purpose processor, a digital signal processor (DSP), an application specific integrated circuit (ASIC), a field programmable gate array (FPGA), or other programmable logic devices, discrete gates or transistor logic devices, discrete hardware components that can implement or perform the methods, steps, and logical block diagrams disclosed in the embodiments of the present disclosure. The general purpose processor may be a microprocessor, or the processor may also be any conventional processor or the like. The steps of the method disclosed in combination with the embodiments of the present disclosure may be directly embodied as being performed by the hardware decoding processor, or performed by a combination of hardware and software modules in the decoding processor. The software module can be located in storage medium in the prior art, such as a random access memory, a flash memory, a read only memory, a programmable read only memory or an electrically erasable programmable memory, a register, and the like. The storage medium is located in the memory, and the processor reads the information in the memory and completes the steps of the above methods in combination with its hardware.

It is to be understood that the memory in the embodiments of the present disclosure may be a volatile memory or a non-volatile memory, or may include both volatile memory and non-volatile memory. The non-volatile memory may be a read-only memory (ROM), a programmable ROM (PROM), an erasable PROM (Erasable PROM, EPROM), or an electrically EPROM (EEPROM) or a flash memory. The volatile memory can be a random access memory (RAM) which acts as an external cache. Through exemplary but not limited illustration, many forms of RAMs are applicable, such as a static RAM (SRAM), dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the systems and methods described herein are intended to comprise, rather than be limited to these and any other suitable types of memory.

The embodiment of the present application further provides a computer program product comprising instructions, and when the instructions of the computer program product run by a computer, the computer performs the method for transmitting synchronization signal blocks of the above method embodiments. Specifically, the computer program product can be run on the above network device and the terminal device.

Those ordinary skilled in the art will appreciate that the units and algorithm steps of the various examples described with reference to the embodiments disclosed herein can be implemented in electronic hardware or a combination of computer software and electronic hardware. Whether these functions are performed in hardware or software depends on the specific application and design constraints of the technical solution. Those skilled in the art can use different methods to implement the described functions for each particular application, but such implementation should not be considered to go beyond the scope of the present application.

Those skilled in the art can clearly appreciate that, for the convenience and brevity of the description, for the specific working process of the system, the apparatus and the unit described above, reference can be made to the corresponding processes in the foregoing method embodiments, and details are not described herein again.

In the several embodiments provided by the present application, it should be understood that the disclosed system, apparatus, and method may be implemented in other manners. For example, the apparatus embodiments described above are merely illustrative. For example, the division of the unit is only a logical function division. In actual implementation, there may be another division manner, for example, multiple units or components may be combined or may be integrated into another system, or some features can be omitted or not be performed. In addition, the mutual coupling, direct coupling or communication connection shown or discussed may be an indirect coupling or communication connection through some interfaces, apparatus or units, and may be in an electrical, mechanical or other forms.

The units described as the separate components may or may not be physically separated, and the components displayed as units may be or may not be physical units, that is, may be located in one place, or may also be distributed to multiple network units. Some or all of the units may be selected according to actual needs to achieve the purpose of the solution of the embodiment.

In addition, each functional unit in each embodiment of the present application may be integrated into one processing unit; or each unit may also exist physically and separately; or two or more units may also be integrated into one unit.

The functions may be stored in a computer readable storage medium if implemented in the form of a software functional unit and sold or used as a standalone product. Based on such understanding, the technical solution of the present application in nature, or a part which contributes to the prior art, or a part of the technical solution, may be embodied in the form of a software product which is stored in a storage medium including some instructions to cause a computer device (which may be a personal computer, a server, a network device, or the like) to perform all or part of the steps of the methods described in various embodiments of the present application. The foregoing storage medium includes: various mediums that can store program code, such as a USB flash disk, a mobile hard disk, a read-only memory (ROM), a random access memory (RAM), a magnetic disk, or an optical disk, or the like.

The foregoing is only a specific embodiment of the present application, but the protection scope of the present application is not limited thereto, and any person skilled in the art can easily think of changes or substitutions within the technical scope disclosed in the present application, which all should fall in the protection scope of this application. Therefore, the protection scope of the present application should be subjected to the protection scope of the claims.

What is claimed is:

1. A method for transmitting synchronization signal blocks, comprising:

when target synchronization signal blocks in S synchronization signal blocks are received within a broadband component carrier, determining, according to target frequency domain locations carrying the target synchronization signal blocks, other target frequency domain locations for carrying other synchronization signal blocks in S target frequency domain locations, wherein the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block;

wherein a frequency interval between two adjacent target frequency domain locations in the S target frequency domain locations is a first target frequency interval;

wherein the determining, according to target frequency domain locations carrying the target synchronization signal blocks, other target frequency domain locations for carrying other synchronization signal blocks in S target frequency domain locations comprises:

determining, according to the target frequency domain locations carrying the target synchronization signal blocks and the first target frequency interval, the other target frequency domain locations;

wherein the first target frequency interval is an integer multiple of a synchronization signal frequency grid;

wherein the S target frequency domain locations are determined based on N second frequency domain locations, and a frequency interval between two adjacent second frequency domain locations in the N second frequency domain locations is a second target frequency interval, wherein N is a positive integer greater than or equal to S.

2. A terminal device, comprising a processor and a memory storing instructions thereon, the processor when executing the instructions, being configured to:

control the transceiver to receive synchronization signal blocks within a broadband component carrier;

when target synchronization signal blocks in S synchronization signal blocks are received within the broadband component carrier, determine, according to target frequency domain locations carrying the target synchronization signal blocks, other target frequency domain locations for carrying other synchronization signal blocks in S target frequency domain locations, wherein the other synchronization signal blocks are part or all of synchronization signal blocks except the target synchronization signal blocks in the S synchronization signal blocks, and the other target frequency domain locations are part or all of target frequency domain locations except target frequency domain locations carrying the target synchronization signal blocks in the S target frequency domain locations, and each of the target frequency domain locations is used for carrying one synchronization signal block;

wherein a frequency interval between two adjacent target frequency domain locations in the S target frequency domain locations is a first target frequency interval;

wherein the processor is specifically configured to:

determine, according to the target frequency domain locations carrying the target synchronization signal blocks and the first target frequency interval, the other target frequency domain locations;

wherein the first target frequency interval is an integer multiple of a synchronization signal frequency grid;

wherein the S target frequency domain locations are determined based on N second frequency domain locations, and a frequency interval between two adjacent second frequency domain locations in the N second frequency domain locations is a second target frequency interval, wherein N is a positive integer greater than or equal to S.

3. The terminal device according to claim 2, wherein the processor is specifically configured to:

determine the other target frequency domain locations according to the target frequency domain locations carrying the target synchronization signal blocks and a distribution pattern of target synchronization signal blocks, wherein the distribution pattern of the target synchronization signal blocks is used to indicate a frequency interval between two adjacent target frequency domain locations, wherein the frequency interval between the two adjacent target frequency domain locations is an integer multiple of a synchronization signal frequency grid.

4. The terminal device according to claim 2, wherein the processor is further configured to:

control the transceiver to receive first configuration information, wherein the first configuration information is used to indicate a number of each of synchronization signal blocks in the S synchronization signal blocks on a frequency domain;

wherein the processor is specifically configured to: determine, according to target frequency domain locations carrying the target synchronization signal blocks and the first configuration information, the other target frequency domain locations.

5. The terminal device according to claim 4, wherein the processor is further configured to:

control the transceiver to receive second configuration information, wherein the second configuration information comprises at least one of the following: a bandwidth of the broadband component carrier, a center frequency point of the broadband component carrier, a value of S, a frequency interval of two adjacent target frequency domain locations in the S target frequency domain locations, and a distribution pattern of synchronization signal blocks;

wherein the processor is specifically configured to: determine, according to the target frequency domain locations carrying the target synchronization signal blocks, the first configuration information and the second configuration information, all of target frequency domain locations except the target frequency domain locations carrying the target synchronization signal blocks in the S target frequency domain locations.

6. The terminal device according to claim 4, wherein the processor is further configured to: control the transceiver to receive third configuration information, wherein the third configuration information comprises at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, wherein L is a positive integer less than S;

wherein the processor is specifically configured to: determine, according to the target frequency domain locations carrying the target synchronization signal blocks, the first configuration information and the third configuration information, target frequency domain locations of L or L−1 synchronization signal blocks except the target frequency domain locations carrying the target synchronization signal blocks in the S target frequency domain locations.

7. The terminal device according to claim 6, wherein in a case that the third configuration information comprises the value L and the first configuration information is received, the third configuration information further comprises numbers of L synchronization signal blocks corresponding to the value L, and wherein the numbers of L synchronization signal blocks corresponding to the value L are determined by a network device based on numbers of synchronization signal blocks reported by the terminal device.

8. The terminal device according to claim 2, wherein the processor is further configured to:

control the transceiver to receive second configuration information, wherein the second configuration information comprises at least one of the following: a bandwidth of the broadband component carrier, a center frequency point of the broadband component carrier, a value of S, a frequency interval of two adjacent first target frequency domain locations in the S target frequency domain locations, and a distribution pattern of synchronization signal blocks;

wherein the processor is specifically configured to:

determine, according to the target frequency domain locations carrying the target synchronization signal blocks, first configuration information and the second configuration information, all of target frequency domain locations except the target frequency domain locations carrying the target synchronization signal blocks in the S target frequency domain locations.

9. The terminal device according to claim 8, wherein the distribution pattern of the synchronization signal blocks is used to indicate a frequency domain offset between synchronization signal blocks except the target synchronization signal blocks in the S synchronization signal blocks and the target synchronization signal blocks;

the processor is further configured to:

determine, according to the frequency domain locations of the target synchronization signal blocks and the frequency domain offset, all of target frequency domain locations except the target frequency domain locations carrying the target synchronization signal blocks in the S target frequency domain locations, and wherein the distribution pattern of the synchronization signal blocks comprises a frequency value of the frequency domain offset or a number value corresponding to the frequency domain offset.

10. The terminal device according to claim 8, wherein the distribution pattern of the synchronization signal blocks is used to indicate a transmission period of each of synchronization signal blocks in the S synchronization signal blocks and/or a time domain offset between synchronization signal blocks except the target synchronization signal blocks and the target synchronization signal blocks;

the processor is further configured to:

determine a time domain location of the other synchronization signal blocks according to a time domain location occupied by the target synchronization signal blocks, and the transmission period of at least part of the synchronization signal blocks, and/or the time domain offset.

11. The terminal device according to claim 8, wherein the processor is further configured to:

control the transceiver to receive the second configuration information corresponding to the target synchronization signal blocks.

12. The terminal device according to claim 2, wherein the processor is further configured to:

control the transceiver to receive third configuration information, wherein the third configuration information comprises at least one of the following: a bandwidth of the broadband component carrier, a center frequency point of the broadband component carrier, a value L, a frequency interval of two adjacent target frequency domain locations in the S target frequency domain locations, and a distribution pattern of synchronization signal blocks, wherein L is a positive integer less than S;

wherein the processor is specifically configured to: determine, according to the target frequency domain locations carrying the target synchronization signal blocks and the third configuration information, target frequency domain locations of L or L−1 synchronization signal blocks except the target frequency domain locations carrying the target synchronization signal blocks in the S target frequency domain locations.

13. The terminal device according to claim 2, wherein frequencies at the S target frequency domain locations are integer multiples of a synchronization signal frequency grid.

14. The terminal device according to claim 2, wherein the processor is further configured to:

control the transceiver to receive fourth configuration information which is transmitted by a network device for the target synchronization signal blocks, wherein the fourth configuration information is used to indicate a frequency domain offset between other synchronization signal blocks in the S synchronization signal blocks and the target synchronization signal blocks;

the processor is further configured to:

determine, according to the frequency domain locations of the target synchronization signal blocks, and a frequency domain offset of synchronization signal blocks except the target synchronization signal blocks with respect to the target synchronization signal blocks, all of the target frequency domain locations except the target frequency domain locations carrying the target synchronization signal blocks in the S target frequency domain locations.

15. The terminal device according to claim 14, wherein the fourth configuration information comprises a number value corresponding to the frequency domain offset, or a frequency value of the frequency domain offset.

16. The terminal device according to claim 2, wherein the processor is further configured to:

control the transceiver to receive fifth configuration information which is transmitted by a network device for the target synchronization signal blocks, wherein the fifth configuration information is used to indicate a transmission period of each of synchronization signal blocks in the S synchronization signal blocks, and/or a time domain offset between the synchronization signal blocks except the target synchronization signal blocks and the target synchronization signal blocks;

the processor is further configured to:

determine a time domain location of the other synchronization signal blocks according to a time domain location occupied by the target synchronization signal blocks, and the transmission period of at least part of the synchronization signal blocks and/or the time domain offset.

17. The terminal device according to claim 2, wherein the processor is further configured to:

control the transceiver to receive sixth configuration information transmitted by a network device, wherein the sixth configuration information is used to indicate a transmission period of each of synchronization signal blocks in the S synchronization signal blocks and/or a time domain offset between the S synchronization signal blocks;

the processor is further configured to:

control the transceiver to determine a time domain location of the other synchronization signal blocks according to a time domain location occupied by the target synchronization signal blocks, and the transmission period of each of the synchronization signal blocks, and/or the time domain offset.

* * * * *